US005637946A

United States Patent [19]
Bushman

[11] Patent Number: 5,637,946
[45] Date of Patent: Jun. 10, 1997

[54] THERMALLY ENERGIZED ELECTRICAL POWER SOURCE

[75] Inventor: Boyd B. Bushman, Lewisville, Tex.

[73] Assignee: Lockheed Corporation, Fort Worth, Tex.

[21] Appl. No.: 531,293

[22] Filed: Sep. 20, 1995

Related U.S. Application Data

[63] Continuation-in-part of Ser. No. 144,814, Oct. 28, 1993, abandoned.

[51] Int. Cl.$^6$ ................................................ H02N 10/00
[52] U.S. Cl. ........................................................ 310/306
[58] Field of Search ................................. 310/306, 309; 136/200, 202, 205, 224, 213–216

[56] References Cited

U.S. PATENT DOCUMENTS

| | | | |
|---|---|---|---|
| 1,648,700 | 11/1927 | Simonds | 136/224 |
| 2,393,196 | 1/1946 | Schwarz | 136/205 |
| 2,622,116 | 12/1952 | Maize | 136/200 |
| 3,194,989 | 7/1965 | Garbuny et al. | 310/306 |
| 3,376,437 | 4/1968 | Meyerand, Jr. et al. | 310/306 |
| 3,402,074 | 9/1968 | Chapman et al. | 310/306 |
| 3,510,714 | 5/1970 | Geer | 310/306 |
| 4,373,142 | 2/1983 | Morris | 310/306 |
| 5,028,835 | 7/1991 | Fitzpatrick | 310/306 |

FOREIGN PATENT DOCUMENTS

| | | | |
|---|---|---|---|
| 345048 | 12/1989 | European Pat. Off. | 136/213 |
| 2258283 | 5/1974 | Germany | 136/200 |

OTHER PUBLICATIONS

Moll, A Reliable Thermo–Converter, Journal of Scientific Instruments vol. III, No. 7, pp. 209–210 Apr. 1926.

Hatsopoulos and Kaye, Analysis and Experimental Results of a Diode Configuration of a Novel Thermoelectron Engine, Proceedings of the IRE, pp. 1574–1579 Sep. 1958.

*Primary Examiner*—Clayton E. Laballe
*Attorney, Agent, or Firm*—James E. Bradley

[57] ABSTRACT

An electrical device functions as a thermally energized DC power source. The device has a base plate of conductive metal. A number of electrode points protrude upward from the base plate, terminating in a sharp edge. A collection plate of conductive metal is positioned above the sharp upper edges of the electrode points. The gap between the electrode points and between the collection plate and the electrode points is electrically insulated. An electrical potential exists between the base plate and the upper collection plate while the device is at and above room temperature. The potential difference increases as the temperature increases.

15 Claims, 3 Drawing Sheets

Flat Surface

Round Surface

Pointed Surface 5,637,946

THERMALLY ENERGIZED ELECTRICAL POWER SOURCE

CROSS REFERENCE TO RELATED APPLICATION

This application is a continuation-in-part of application Ser. No. 08/144,814, filed Oct. 28, 1993 now abandoned.

BACKGROUND OF THE INVENTION

1. Field of the Invention

This invention relates in general to electrical devices for supplying a DC voltage, particularly to a device which is thermally energized.

2. Description of the Prior Art

A wide variety of DC power sources exist. Most use a form of chemical energy, such as batteries. Others use thermal energy, solar energy or radioactive energy as a source. The source results in an electrical potential difference between positive and negative electrodes.

SUMMARY OF THE INVENTION

In this invention, an electrical device is provided that will supply a DC voltage in response to the application of heat for low power applications. The device includes a base plate that is a conductor. A large number of electrode points protrude upward from the conductor, the electrode points being electrically common with the base plate. In one instance, the electrode points comprise small diameter of pins. In another instance, the electrodes comprise turns of a sheet wound into a coil having a thin edge. A collection plate is spaced above the upper edge of the electrode points by a small insulation gap. The electrode points are also spaced apart from each other. A number of stages are stacked on one another, with the collection plate of one stage being the base plate of the next stage. Experiments have shown that the application of heat to the device results in a potential difference between the base plate and the collection plate of each stage as a result of electron emission from the electrode points. This potential difference reverses polarity when the leads of the voltmeter are reversed. The amount of heat need not be very much, and a low level voltage will exist even at ambient room temperature.

DETAILED DESCRIPTION OF THE INVENTION

Figure 1:
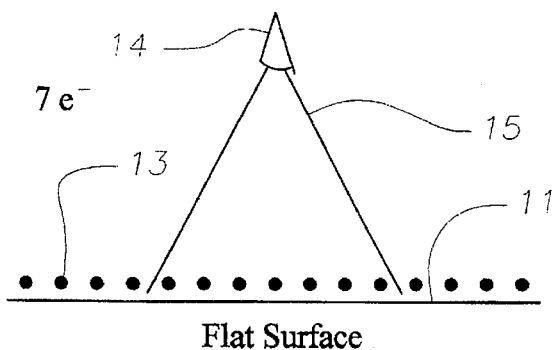
FIG. 1 is a schematic illustrating electrons existing on a flat conductive surface.

Referring to FIG. 1, flat surface 11 is an electrical conductor plate. The symbols 13 schematically indicate electrons located on the surface of the flat plate 11. Symbol 15 indicates a field of view of flat plate 11 from observation point. In this field of view area 15, seven electrons 13 are illustrated. In reality, of course, there would be an extremely large number, but for comparison purposes, seven are shown.

Figure 2:
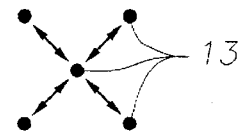
FIG. 2 is a diagram of electron propulsion force vectors for the flat surface of FIG. 1.

Referring to FIG. 2, electrons 13 of flat plate 11 mutually repulse each other. There are no components of forces acting on electrons 13 in any direction normal to flat plate 11. Consequently, there is no electron propulsion force tending to expel or emit any electrons from the flat plate 11. The application of heat causes the emission of electrons from flat plate 11.

Figure 3:
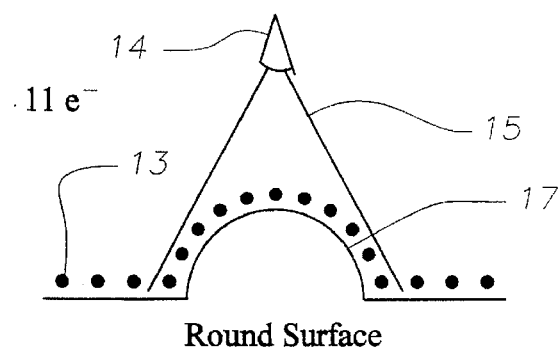
FIG. 3 is a schematic illustrating electrons existing on a round surface.
Figure 4:
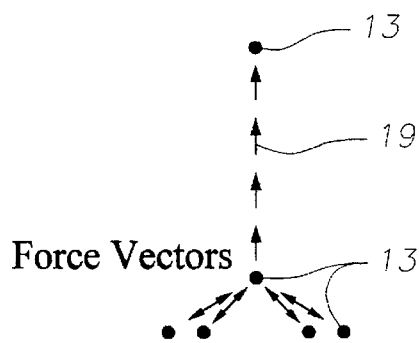
FIG. 4 is a diagram of electron propulsion force vectors for the round surface of FIG. 3.

In FIG. 3, round or arcuate surface 17 is also an electrical conductor. Because of greater surface area of arcuate surface 17 over flat surface 11 in the same field of view 15, there will be eleven electrons 13 in comparison with seven electrons 13 of FIG. 1. As shown in FIG. 4, the natural repulsion of the electrons toward each other results in a force vector 19 acting normal to round surface 17. Force vector 19 tends to push or expel electrons 13 from the top of the round surface under the application of heat.

Figure 5:
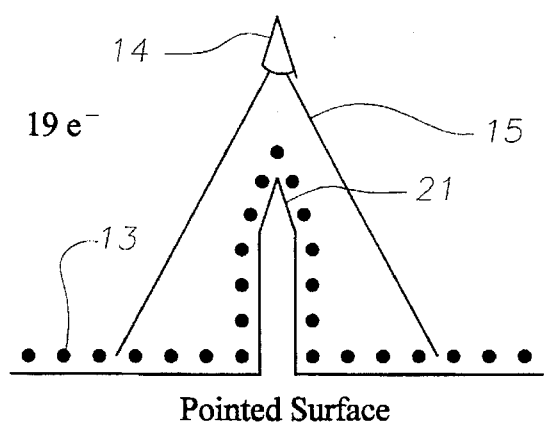
FIG. 5 is a schematic electrons existing on a pointed surface.
Figure 6:
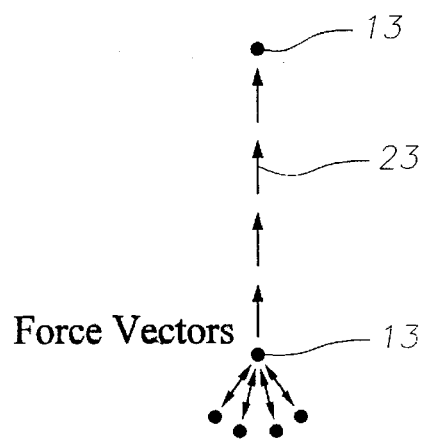
FIG. 6 is a diagram of electron propulsion force vectors for the pointed surface of FIG. 5.

Pointed surface 21 in FIG. 5 provides an even greater number of electrons 13 within the same field of view 15. In this instance, nineteen electrons 13 exist by way of comparison to the eleven electrons 13 of FIG. 3 and the seven electrons 13 of FIG. 2. A net upward force vector 23 exists on pointed surface 21 that is of greater magnitude than force vector 19 because of the larger number of electrons 13 within the field of view. A sharp or pointed surface thus will emit or expel electrons 13 more easily under the application of heat than a round surface or a flat surface.

FIG. 4 illustrates an operable thermal electrical device 25, which may serve as a low power voltage source. Electrical device 25 has a base plate 27 which is flat and is of a conductive metal. Base plate 27 has a large number of first stage electrode points 29 protruding from and perpendicular to base plate 27. Electrode points 29 are small diameter metal pins, each with a sharp point or distal end. Electrode points 29 are electrically in common with each other and with base plate 27. Preferably, each has the same height. Electrode points 29 are evenly spaced apart and insulated from each other, so as to be electrically common only at the base plate 27.

A first stage insulator 31 comprising a thin sheet of electrically inert material is positioned at the tops of electrode points 29. Insulator 31 is parallel to and coextensive with base plate 27. A first stage collection plate 35 locates above insulator 31, being separated from the apexes of electrode points 29 by a thin gap 37. Gap 37 is preferably the same as the thickness of insulator 31, although for illustration purposes it appears to be greater in the drawing. First stage collection plate 35 is essentially identical to base plate 27. It is a conductor, and is flat, coextensive and parallel with base plate 27. A plurality of second stage electrode points 39 protrude upward from first stage collection plate 35. Second stage electrode points 39 are identical to first stage electrode points 29. Electrode points 39 are joined to and electrically common with first stage collection plate 35. Second stage electrode points 39 are evenly spaced apart and electrically insulated from each other.

A second stage insulator 41 identical to first stage insulator 31 separates the apexes of electrode points 39 from a second stage collection plate 43. Second stage collection plate 43 is identical to first stage collection plate 35. It is parallel to first stage collection plate 35 and is of a conductive metal. Second stage collection plate 43 is spaced above the upper ends of second stage electrode points 39 by the same distance as gap 37, which is the thickness of insulator 41.

A plurality of third stage electrode points 45 are joined to and electrically common with second stage collection plate 43 identical to first and second stage electrode points 29, 39. A third stage insulator 47 separates the upper ends of third stage electrode points 45 from a third stage collection plate 49. Third stage collection plate 49 is identical to first and second stage collection plates 35, 43. Third stage collection plate 49 is parallel to first and second stage collection plates 35, 43. Third stage collection plate 49 has a plurality of fourth stage electrode points 51 that protrude upward. Fourth stage electrode points 51 are electrically in common with third stage collection plate 49 and are identical to electrode points 45, 39 and 29.

An upper or fourth stage collection plate 53 locates above fourth stage electrode points 51 and is separated by fourth stage insulator 52, which is identical to insulators 31, 41, and 47. Collection plate 53 is flat and parallel to collection plates 47, 41 and 31, and is of a conductive metal.

Figure 7:
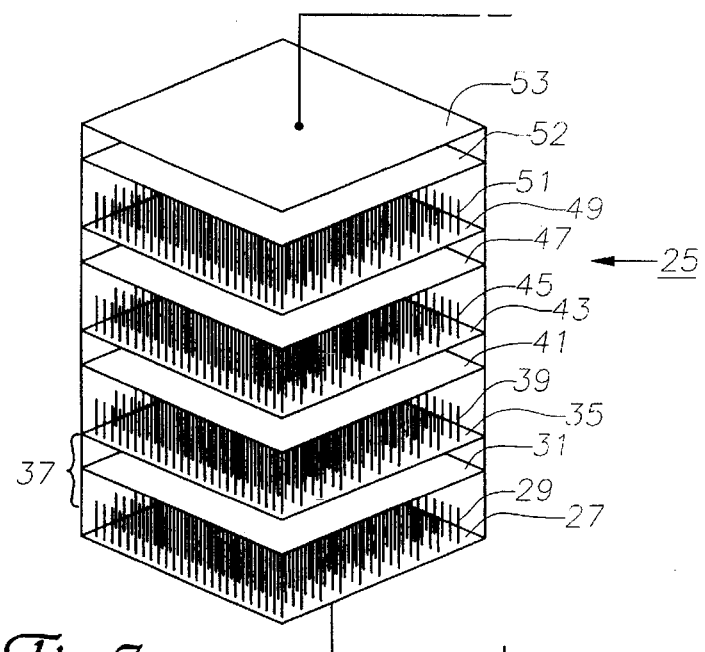
FIG. 7 is a perspective schematic view illustrating a first embodiment of an electrical device constructed in accordance with this invention.

The electrical device 25 of FIG. 7 thus has four identical stages, and more or less stages may be stacked together if desired.

Figures 8, 9, 10:
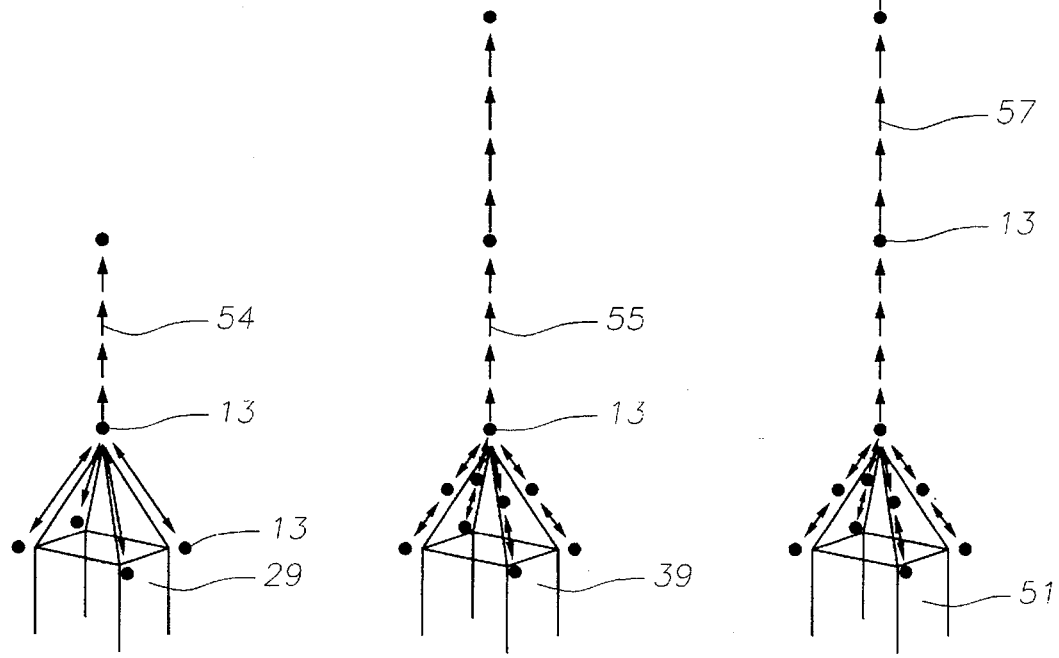
FIG. 8 is a diagram of electron propulsion force vectors occurring between a base plate and a first stage collection plate of the electrical device of FIG. 7.
FIG. 9 is a diagram of electron propulsion force vectors occurring between the first stage collection plate and a second stage collection plate of the electrical device of FIG. 7.
FIG. 10 is a diagram of electron propulsion force vectors occurring between a third stage collection plate and a fourth stage collection plate of the electrical device of FIG. 7.

FIG. 8 illustrates the electron propulsion force 54 existing at the first stage electrode points 29 between base plate 27 and first stage collection plate 35. The mutual repulsion of the electrons 13 on the sharp pointed electrode points 29 and thermal energy applied to the device cause an upward vector force 54. Electrons 13 will be emitted from the pointed ends of electrode points 29, will pass through first stage insulator 31 and be captured by first stage collection plate 35.

Referring to FIG. 9, the vector forces 55 at second stage electrode points 39 are of greater magnitude than vector forces 54. This occurs because of the greater number of electrons 13 being captured or emitted from the pointed ends of second stage electrode points 39. The greater number occurs due to the flow of electrons 13 from the first stage electrode points 29 to first stage collection plate 35. FIG. 10 shows the vector forces acting on the fourth stage electrode points 51. The vector forces 57 are greater than vector forces 55 or 54 because of the electron 13 flow received from the electrode points 29, 39, 45.

Tests have shown that a device 25 constructed similar to that shown in FIG. 7 will generate a potential difference upon the application of heat. In a first test, device 25 at ambient room temperature of 72 degrees F. provided approximately 180 mv (millivolts) of constant potential difference between base plate 27 and the upper collection plate 53. When the voltmeter leads were connected in reverse, the 180 mv reversed polarity. Device 25 was tested at room temperature without application of any other external energy source other than the thermal energy of the ambient room temperature.

The first device 25 tested had seven layers or stages. Each stage was identical, with the first stage having approximately one hundred evenly spaced electrode points 29. The diameter of each of the first stage electrode points 29 was less than 0.002 inch. The height of the first stage electrode points 29 does not appear to be critical, but was 0.250 inch. The base plate 27 was square, having dimensions of approximately ⅝ inch by ⅝ inch. Insulator 31 was a conventional sheet of paper, having a thickness of about 0.015 inch or less.

In a second test, another device 25 was constructed similar to the one described above and tested. At ambient room temperature, it provided a positive 0.3 mv. When the leads were reversed, the voltage was negative 0.7 mv. In a third test, another device 25 was constructed similar to the others. Hot air was discharged onto the device 25. The positive voltage level at room temperature was 0.3 mv, and when heated, increased to 17 mv. The amount of heat increase for that test was not measured.

In a fourth test of anther device 25 constructed similar those above, at ambient temperature, the voltage potential was 70 mv. When the leads were reversed, the polarity of the device changed, and the level of voltage remained the same. Device 25 was then heated to approximately 212 degrees F. While heating, the voltage linearly increased from 70 mv to 120 mv. Device 25 was held at maximum temperature for 30 seconds. Then room temperature air was blown onto the device to cool it back to room temperature. Once returning to room temperature, the device exhibited stable voltage potential within about 30 seconds. The voltage linearly decreased from 120 mv back to 70 mv.

It is not known completely why the device is able to achieve a constant potential difference. One theory is that thermal energy supplies the excess flow of electrons due to thermal agitation. The thermal agitation results in electron emission from the electrode points of electrons which achieve an escape velocity. The thermal energy 29 causes the free electrons to be emitted or expelled from the electrode points.

Figure 11:
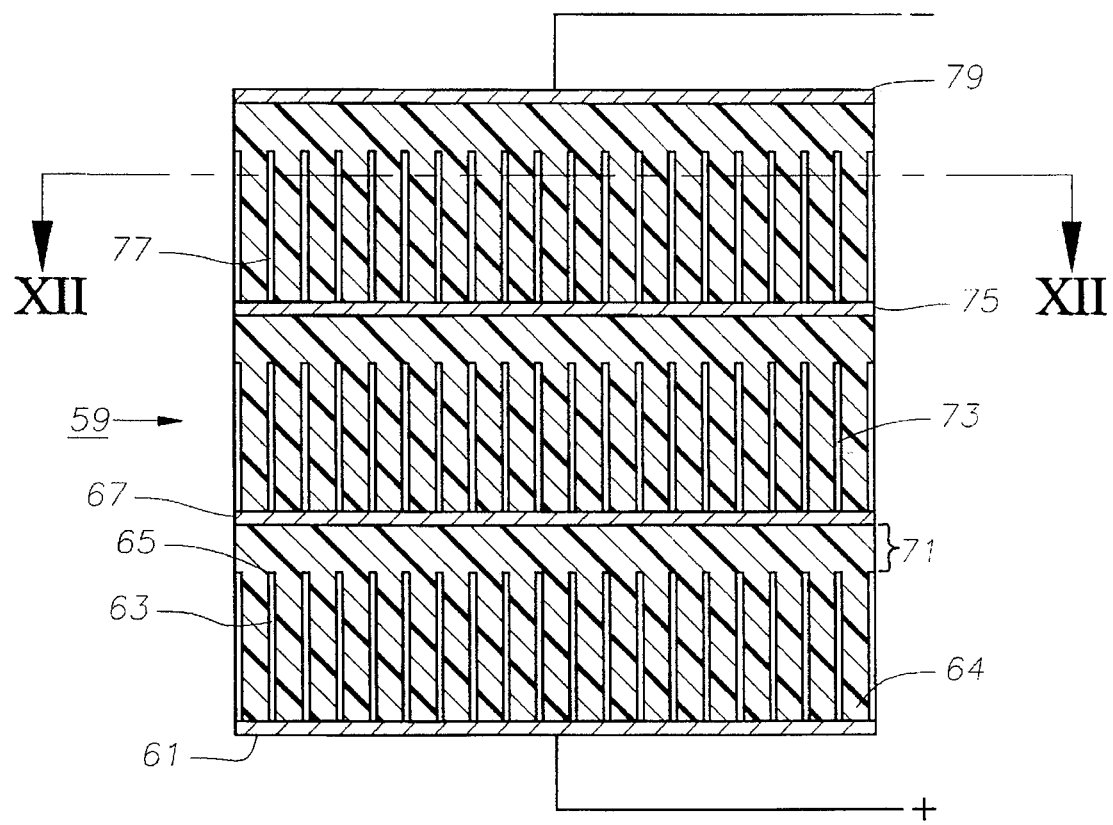
FIG. 11 is a schematic sectional view illustrating an alternate embodiment of an electrical device constructed in accordance with this invention.
Figure 12:
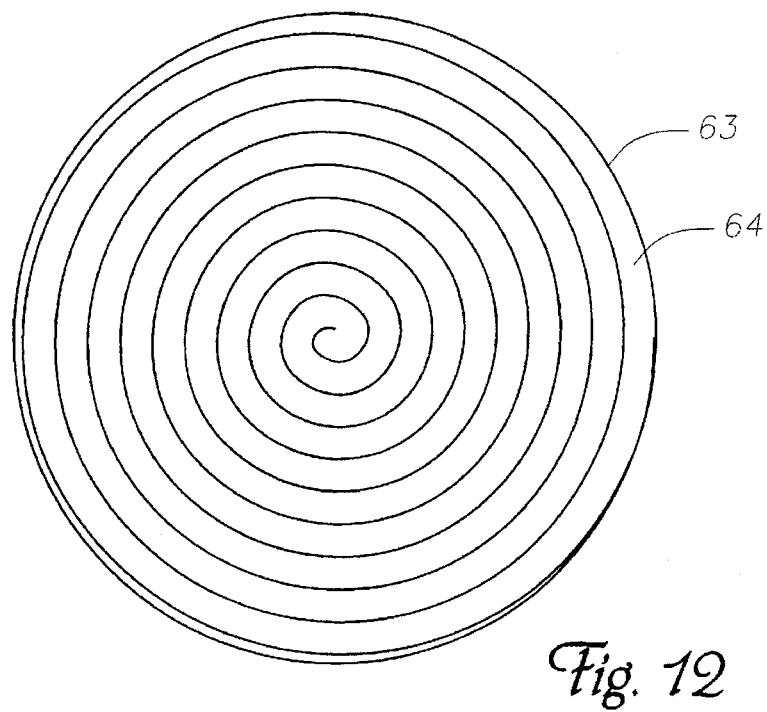
FIG. 12 is a schematic sectional view of the electrical device of FIG. 11, taken along the line XII—XII of FIG. 11.

FIGS. 11 and 12 illustrate an alternate electrical device 59 that works in the same manner as electrical device 25 of FIG. 7. Electrical device 59 has a conductive base 61. An electrode coil 63 is located on and protrudes perpendicular to base 61. Coil 63 is a thin metal sheet that is coiled tightly into a large number of turns, as illustrated in FIG. 12. Coil 63 is of conductive metal and is joined to and electrically common with base 61. The turns of coil 63 do not touch each other, rather are separated by spaces that are filled with electrical insulation 64. The spaces containing insulation 64 between the turns of coil 63 are approximately the same thickness as the sheet of coil 63. The turns of coil 63 have sharp distal ends or upper edges 65 that are located in a plane parallel with base plate 61. Although coil 63 comprises only a single sheet, the insulated turns of coil 63 result in a plurality of electrode points, with each turn being an electrode. Electrical insulation 64 also locates over the sharp upper edges 65 of the turns of coil 63.

A first stage collection plate 67 locates a short distance above the upper edge 65 of coil 63, being separated from electrical contact by insulation 64. A second stage electrode coil 73 is secured to the upper surface of first stage collection plate 67. Coil 73 is identical to coil 63. A second stage collection plate 75 locates a short distance above the upper edges of second stage electrode coil 73. A third stage electrode coil 77 locates on the upper surface of second stage collection plate 75. Third stage electrode coil 77 is spaced a short distance below a third stage collection plate 79. Consequently, there are three identical stages in the electrical device shown 59. There may be more stages as well. The operation of device 59 is the same as that of the electrical device 25 of FIG. 7. The turns of the coil 63 serve as separate electrode points. The sharp edges 65 cause an expulsion of electrons upon application of thermal energy, which pass through insulation layers 64 and are collected by the collection plates 67, 75, and 79.

Tests of electrical device 59 have also shown that a steady potential difference will exist between the base plate 61 and the upper collection plate 79 upon application of thermal energy. The device tested was made by wrapping concentric layers of metal and insulation. The voltage at ambient room temperature was positive 0.3 mv with the leads in one position. When switched, the votage reading was negative 0.7 mv. The ambient temperature supplied the thermal energy. A second test of another device constructed as shown in FIGS. 11 and 12 was made. At room temperature, the level of voltage with one polarity was positive 0.1 mv. With the leads switched, the voltage was negative 0.6 mv.

One of the devices 59 tested had three identical stages. The first stage had a coil 63 made from a thin aluminum sheet, having a width or height of about 0.250 inch and a thickness of less than 0.015 inch. The diameter of the coil 63 was about 0.750 inch. The insulation 64 comprised sheets of paper approximately the same thickness as the thickness of the sheet of coil 63.

The invention has significant advantages. The electrical device is capable of functioning as a voltage source upon the application of thermal energy.

While the invention has been shown in only two of its forms, it should be apparent to those skilled in the art that it is not so limited, but is susceptible to various changes without departing from the scope of the invention.

I claim:

1. An electrical device, having a first stage comprising:
a base plate of a conductive metal;
at least one electrode, having a base end joined to and electrically common with the base plate, the electrode protruding from the base plate, terminating in a sharp distal end; and
a collection plate of conductive metal positioned adjacent the distal end and electrically insulated therefrom by a selected gap, wherein heat energy supplied from placement of the device at a room temperature of 72 degrees F. causes a difference in electrical potential between the base plate and collection plate occurs due to electron propulsion force at the sharp distal end of the electrode.

2. The electrical device according to claim 1 wherein there are a plurality of the electrodes, each comprising an electrode point which is electrically insulated from the other electrode points except at the base plate.

3. The electrical device according to claim 1 wherein the electrode comprises a thin sheet of conductive metal wound into a coil, the sheet being joined to the base plate at one edge, and with another edge being the distal end; and wherein
each turn of the coil is electrically insulated from adjacent turns.

4. The electrical device according to claim 1 further comprising a second stage, the second stage comprising a second stage electrode, having a base end joined to and electrically common with the collection plate of the first stage, the second stage electrode protruding from the collection plate of the first stage, terminating in a sharp distal end; and
a second stage collection plate of conductive metal positioned adjacent the distal end of the second stage electrode and electrically insulated therefrom by a selected gap, wherein a difference in electrical potential between the base plate and second stage collection plate occurs due to electron propulsion force at the sharp distal end of the electrode of the first stage and the second stage electrode while the device is at the room temperature.

5. The electrical device according to claim 1 wherein the potential difference increases when the temperature of the device is increased above the room temperature.

6. The electrical device according to claim 1 wherein the potential difference increases when the temperature of the device is increased 212 degrees F.

7. An electrical device, having a first stage comprising:
a base plate of a conductive metal;
a plurality of electrode points, each having a base end joined to and electrically common with the base plate, the electrode points comprising pins closely spaced to each other, protruding from the base plate parallel to each other and terminating in sharp distal ends, the electrode points being electrically insulated from each other except at the base plate; and
a collection plate of conductive metal positioned adjacent the distal ends and electrically insulated therefrom by a selected gap, wherein while the device is at a room temperature of 72 degrees F., a difference in electrical potential between the base plate and collection plate occurs due to electron propulsion force at the sharp distal ends of the electrode points, and wherein the difference in electrical potential increases with an increase in temperature of the device above the room temperature.

8. The electrical device according to claim 7 further comprising a second stage, the second stage comprising:
a plurality of second stage electrode points, each having a base end joined to and electrically common with the collection plate of the first stage, the second stage electrode points comprising pins closely spaced to each other, protruding from the collection plate of the first stage parallel to each other and terminating in sharp distal ends, the second stage electrode points being electrically insulated from each other except at the collection plate of the first stage; and
a second stage collection plate of conductive metal positioned adjacent the distal ends of the second stage electrode points and electrically insulated therefrom by a selected gap, wherein a difference in electrical potential between the base plate and second stage collection plate occurs due to electron propulsion force at the sharp distal ends of the electrode points of the first stage and the second stage electrode points while the device is at and above the room temperature.

9. The electrical device according to claim 7 wherein the potential difference when the temperature of the device is at 212 degrees F. is substantially greater than when the device is at room temperature.

10. An electrical device, having a first stage comprising:
a base plate of a conductive metal;
a sheet of conductive metal wound into a coil with a plurality of turns, the coil having a base edge joined to and electrically common with the base plate, the coil having a sharp distal edge opposite the base edge, each turn of the coil being electrically insulated from adjacent turns except at the base plate; and a collection plate of conductive metal positioned adjacent the distal edge of the coil and electrically insulated therefrom by a selected gap, wherein a difference in electrical potential between the base plate and collection plate occurs due to electron propulsion force at the sharp distal edge of the coil while the device is at and above the room temperature.

11. The electrical device according to claim 10 further comprising a second stage, the second stage comprising:

a second stage sheet of conductive metal wound into a second stage coil having a plurality of turns, the second stage coil having a base edge joined to and electrically common with the collection plate of the first stage, the legend stage coil having a sharp distal edge opposite the base edge of the second stage sheet, each turn of the second stage coil being electrically insulated from adjacent turns except at the collection plate of the first stage; and a second stage collection plate of conductive metal positioned adjacent the distal edge of the second stage coil and electrically insulated therefrom by a selected gap, wherein a difference in electrical potential between the base plate and second stage collection plate occurs due to electron propulsion force at the sharp distal edge of the coil of the first stage and the second stage coil while the device is at and above the room temperature.

12. The electrical device according to claim 10 wherein is the coil is mounted substantially perpendicular to the base plate.

13. An electrical device, comprising:

a base plate of a conductive metal;

a plurality of first stage electrode points, each having a base end joined to and electrically common with the base plate, the first stage electrode points comprising pins closely spaced to each other, protruding from the base plate parallel to each other, perpendicular to the base plate and terminating in sharp distal ends, the first stage electrode points being electrically insulated from each other except at the base plate;

a first stage collection plate of conductive metal positioned adjacent the distal ends generally parallel to the base plate and electrically insulated therefrom by a selected gap;

a plurality of second stage electrode points, each having a base end joined to and electrically common with the first stage collection plate, the second stage electrode points comprising pins closely spaced to each other, protruding from the first stage collection plate parallel to each other, perpendicular to the first stage collection plate, and terminating in sharp distal ends, the second stage electrode points being electrically insulated from each other except at the first stage collection plate; and a second stage collection plate of conductive metal positioned adjacent the distal ends of the second stage electrode points, generally parallel to the first stage collection plate and electrically insulated therefrom by a selected gap, wherein while the device is at a room temperature of 72 degrees F., a difference in electrical potential between the base plate and second stage collection plate occurs due to electron propulsion force at the sharp distal ends of the first and second stage electrode points, and wherein while the device is at a selected temperature above room temperature, the potential difference is substantially greater than while at room temperature.

14. The electrical device according to claim 13 wherein the selected temperature is about 212 degrees F.

15. An electrical device, comprising:

a base plate of a conductive metal;

a first stage sheet of conductive metal wound into a first stage coil having a plurality of turns, the first stage coil having a base edge joined to and electrically common with the base plate, the first stage coil being generally perpendicular to the base plate and having a sharp distal edge opposite the base edge, each turn of the first stage coil being electrically insulated from adjacent turns except at the base plate;

a first stage collection plate of conductive metal positioned adjacent the distal edge of the first stage coil and electrically insulated therefrom by a selected gap;

a second stage sheet of conductive metal wound into a second stage coil having a plurality of turns, the second stage coil having a base edge joined to and electrically common with the first stage collection plate, the second stage coil being generally perpendicular to the first stage collection plate having a sharp distal edge opposite the base edge of the second stage coil, each turn of the second stage coil being electrically insulated from adjacent turns except at the first stage collection plate; and a second stage collection plate of conductive metal positioned adjacent the distal edge of the second stage coil and electrically insulated therefrom by a selected gap, wherein while the device is at a room temperature of 72 degrees F. and above, a difference in electrical potential between the base plate and second stage collection plate occurs due to electron propulsion force at the sharp distal edges of the first and second stage coils, the difference increasing with an increase in temperature of the device above the room temperature.

* * * * *